United States Patent
Garner, IV et al.

(10) Patent No.: US 6,863,214 B2
(45) Date of Patent: Mar. 8, 2005

(54) IMAGE ENABLED REJECT REPAIR FOR CHECK PROCESSING CAPTURE

(75) Inventors: Andrew J. Garner, IV, Charlotte, NC (US); Terry H. Beck, Advance, NC (US)

(73) Assignee: Wachovia Corporation, Charlotte, NC (US)

(*) Notice: Subject to any disclaimer, the term of this patent is extended or adjusted under 35 U.S.C. 154(b) by 941 days.

(21) Appl. No.: 09/775,079

(22) Filed: Feb. 1, 2001

(65) Prior Publication Data

US 2001/0051921 A1 Dec. 13, 2001

Related U.S. Application Data

(60) Provisional application No. 60/179,557, filed on Feb. 1, 2000.

(51) Int. Cl.[7] .............................................. G06F 17/60
(52) U.S. Cl. ........................ 235/379; 705/45; 382/137; 382/140
(58) Field of Search ................................ 235/375, 379; 902/37, 38, 39, 40; 705/39, 42, 45; 382/137, 138, 139, 140

(56) References Cited

U.S. PATENT DOCUMENTS

| | | | | |
|---|---|---|---|---|
| 3,764,978 A | * | 10/1973 | Tyburski et al. | 382/137 |
| 4,555,617 A | * | 11/1985 | Brooks et al. | 235/379 |
| 4,564,752 A | * | 1/1986 | Lepic et al. | 235/437 |
| 4,722,444 A | | 2/1988 | Murphy et al. | |
| 4,947,321 A | | 8/1990 | Spence et al. | |
| 5,159,548 A | | 10/1992 | Caslavka | |
| 5,206,915 A | | 4/1993 | Kern et al. | |
| 5,221,830 A | | 6/1993 | Kern | |
| 5,237,158 A | | 8/1993 | Kern et al. | |
| 5,349,170 A | | 9/1994 | Kern | |
| 5,444,794 A | | 8/1995 | Uhland, Sr. | |
| 5,488,671 A | | 1/1996 | Kern | |
| 5,506,691 A | * | 4/1996 | Bednar et al. | 235/379 |
| 5,532,464 A | | 7/1996 | Josephson et al. | |
| 5,544,043 A | * | 8/1996 | Miki et al. | 705/45 |
| 5,691,524 A | | 11/1997 | Josephson | |
| 5,754,673 A | | 5/1998 | Brooks et al. | |
| 5,825,506 A | * | 10/1998 | Bednar et al. | 382/137 |
| 5,874,717 A | | 2/1999 | Kern et al. | |
| 5,895,455 A | * | 4/1999 | Bellinger et al. | 705/42 |
| 5,917,965 A | * | 6/1999 | Cahill et al. | 382/305 |
| 5,940,844 A | * | 8/1999 | Cahill et al. | 235/379 |
| 5,963,659 A | * | 10/1999 | Cahill et al. | 382/139 |
| 6,351,553 B1 | * | 2/2002 | Hayosh | 382/139 |
| 6,504,946 B1 | * | 1/2003 | Rossignoli | 382/139 |

FOREIGN PATENT DOCUMENTS

WO    WO 84/02597    7/1984

* cited by examiner

Primary Examiner—Jared J. Fureman
(74) Attorney, Agent, or Firm—Womble Carlyle Sandridge & Rice, PLLC

(57) ABSTRACT

A method and apparatus for processing a plurality of financial documents, comprising, a document processor, wherein, for each financial document, the document processor captures data encoded on the financial document and an image of the financial document during a prime pass, and assigns a prime pass sequence number to each financial document. The apparatus includes a computer database in which the prime pass data and image is stored in association with the prime pass sequence number for the financial document. The document processor is adapted to determine whether the financial document should be rejected because the data and document image needs to be repaired or the data only needs to be repaired. If the data and image needs to be repaired, the document processor, or a desktop scanner/reader, recaptures the data and image, assigns a recapture sequence number to the financial document, and the recaptured data and image is stored in the computer database in association with the recapture sequence number. An image repair application is adapted to permit an operator to locate a prime pass image that matches the recaptured image, and to repair the document image by visually comparing the recaptured image with the prime pass image. The repaired document image is then stored in the computer database in association with the corresponding prime pass sequence number.

14 Claims, 8 Drawing Sheets

IMAGE ENABLED REJECT REPAIR FOR CHECK PROCESSING CAPTURE

This application claims the benefit of provisional application Ser. No. 60/179,557 filed Feb. 1, 2000.

A portion of this disclosure contains material that is subject to copyright protection. The copyright owner consents to the reproduction of the disclosure, as it appears in the Patent and Trademark Office patent files or records, but otherwise reserves all copyright rights whatsoever.

FIELD OF THE INVENTION

The present invention generally relates to an improved system and method for repairing items, such as deposit slips and associated checks, that have been rejected during check processing using image capture.

BACKGROUND OF THE INVENTION

Reject repair is a well known problem in high volume check processing operations that are typically conducted by banks. Conventional approaches for repairing rejected items in check processing systems involve downloading the rejected MICR codeline data to an offline system for repair, followed by a re-submission of the linked or matched MICR codeline data back to the check processing system. The offline system disadvantageously has to rehandle all of the physical items for correction. A disadvantage of this approach is that the recaptured image and MICR codeline data may not be matched to the correct prime pass item sequence number. This "mismatching" results in incorrect images delivered online or in statements. Another disadvantage of this approach (which is usually the result of a "piggyback" or misoriented image) is the loss of the correct relationship of any inserted item to their original position in the capture string, which may cause deposits to be out of balance and items to be credited to the wrong accounts. Thus, there remains a need for a check processing system where the recaptured MICR codeline data and images for rejected items is associated with the correct prime pass sequence number. There also remains a need for a check processing system that preserves the correct sequential relationship of MICR codeline data and images for inserted items to the sequence of items established during the prime pass.

SUMMARY OF THE INVENTION

A method and apparatus for processing a plurality of financial documents, comprising, a document processor that captures data encoded on the financial documents and an image of the financial documents during a prime pass, and assigns a prime pass sequence number to each financial document. The apparatus includes a computer database in which the prime pass data and image is stored in association with the prime pass sequence number for the financial document. The document processor is adapted to determine whether the financial document should be rejected because the data and document image needs to be repaired or the data only needs to be repaired. If the data and image needs to be repaired, the document processor, or another reader/scanner, recaptures the data and image, assigns a recapture sequence number to the financial document, and the recaptured data and image is stored in the computer database in association with the recapture sequence number. An image repair application is adapted to permit an operator to locate a prime pass image that matches the recaptured image, and to repair the document image by visually comparing the recaptured image with the prime pass image. The repaired document image is then stored in the computer database in association with the corresponding prime pass sequence number.

The apparatus can be configured to allow the operator to repair the prime pass image by visually comparing it with the recaptured image and selecting either the prime pass image or the recaptured image.

If there is no prime pass image that corresponds to the recaptured image, the recaptured image is stored in the computer database in correct relation to the financial sequence established during the prime pass.

BRIEF DESCRIPTION OF THE DRAWINGS

FIG. 5 is a screen shot of the user interface to the image repair client application of the present invention.

FIG. 6 is a screen shot of the user interface to the keying application.

DETAILED DESCRIPTION OF PREFERRED EMBODIMENT

Figure 1:
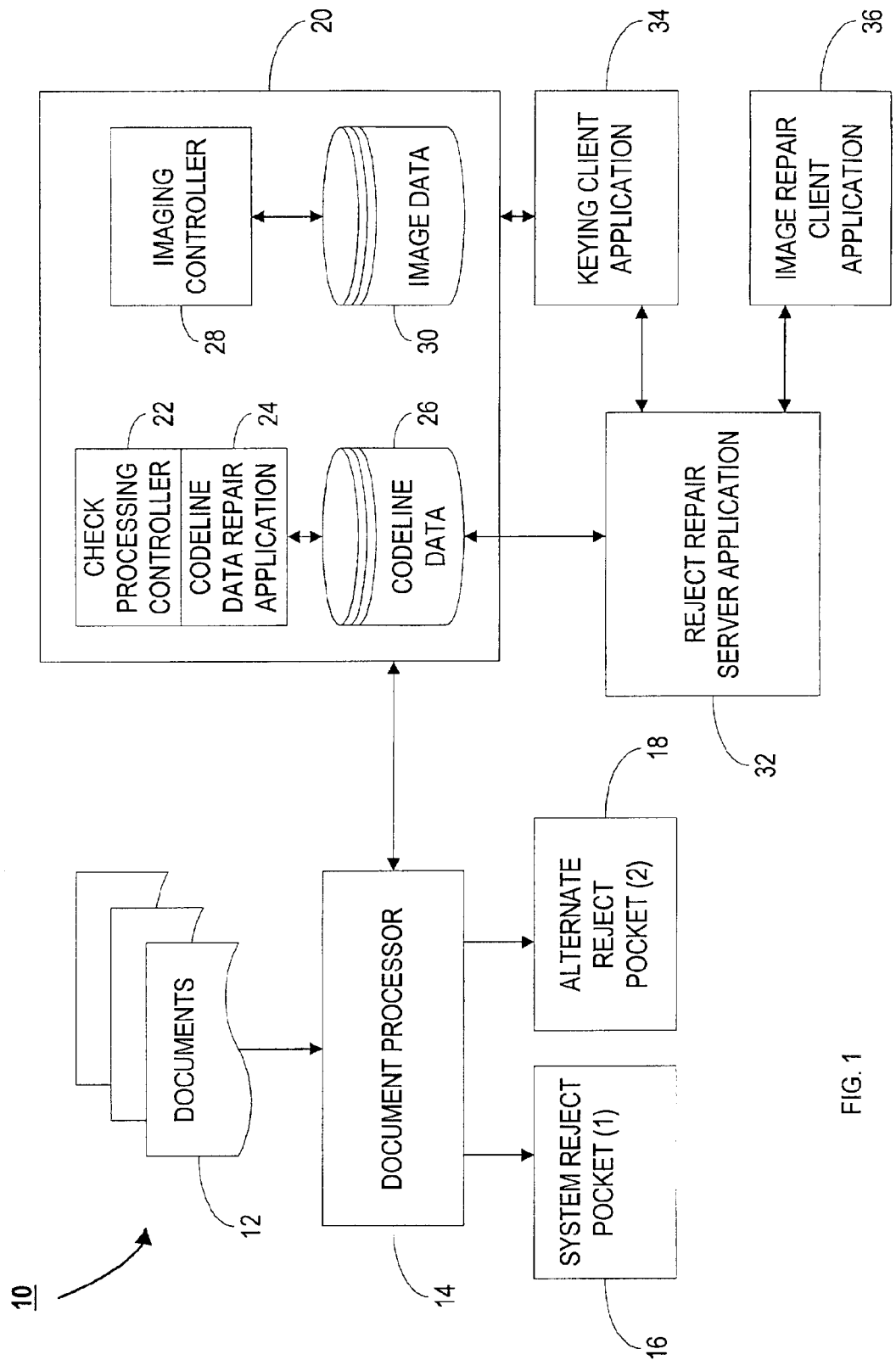
FIG. 1 is a diagram of a checking processing system in accordance with the present invention.

The system 10 in accordance with the present invention is illustrated in FIG. 1. Documents for processing 12, such as a check, deposit slip or other machine-readable document, are first physically prepared for batch processing. This includes removing paper clips, staples, rubber bands, etc. from the documents and arranging them in trays of batches with proper orientation and in proper order. A batch is a logical group of work, usually consisting of approximately 300 documents. A batch can be a group of checks from another financial institution or a cut from a teller's machine. For each batch, a batch slip is typically encoded with the dollar total of all debit items within the batch. Batches can optionally be divided it into smaller groups called subbatches, which are handled in the same way as a batch.

A block is the next higher level of control after the batch (and optional subbatch). A block is a group of batches originating from the same source, such as a cash letter originating from another financial institution or work originating from one branch or teller location. Blocks can be grouped together, each with its own block slip, into trays of approximately 3000 items.

The tracer group, the next higher level of control, consists of a group of blocks. Tracer-group slips are placed in front of the documents that constitute the tracer group.

An entry is the highest level of control. By combining several tracer groups, an entry is created, which is a convenient unit of work for a document processor.

To take advantage of concurrent processing, that is, the ability to start subsequent processing of items before entering all the items of an entry, subsets can be specified within an entry. A subset consists of a single tracer group. Distribution tasks can begin when the first subset is completed.

After the documents 12 are prepared for processing, they are ready for prime-pass entry, which is the first task of physical processing. An identification number of the entry, such as the first 4 digits in the account-number field on the first tracer slip of the entry, is entered by an operator, as wells as parameters for sorting the documents and other parameters, such as the date, the amount, the control number, the account number, and the routing and transit number.

The documents 12 are then fed into a document processor 14, which is conventional. An exemplary document processor is available from International Business Machines Corporation, New Orchard Road, Armonk, N.Y. 10504, and is known as the IBM3890/XP Series document processor, which is a high-speed, high-volume document processor that reads magnetically-inscribed documents or optical-character documents.

The first documents that enter the document processor 14 are the tracer slips. Tracer slips maintain pass-to-pass control. The document processor 14 routes them to either the rehandle or the reject pockets. The tracer slips serve to separate and identify the tracer groups within the pockets. The check imaging system 20 builds a record for each tracer slip selected to a pocket. The tracer records contain the item count and dollar total for each rehandle pocket used during this pass. The check imaging system 20 uses the totals as a control for items as they reenter the system on subsequent passes.

Tracer groups also can be used to divide a large entry into subsets in order to take advantage of subset processing. To use subset processing, it should be specified in the sort pattern, and it should be specified that every tracer group signals the start of a new subset.

The document processor 14 reads the first group of tracer slips. It then reads the block slip, which identifies all related documents as part of the block, and directs it to the reject pocket. The batch slip, which identifies all related documents as part of a batch, follows the block slip and is also directed to the reject pocket. Subbatch slips, if used, follow the batch slip. Placement of the subbatch slips is controlled by the operator, and can be placed at several intervals within a batch, because they simply provide an additional totaling function. The check imaging system 20 uses the encoded data from the block, batch, and subbatch slips to balance the documents within the block, batch, and subbatch and to identify the source of the documents. Block, batch, and subbatch slips can either precede or follow the items that they control.

Divider slips separate items within each kill pocket into manageable groups, or bundles. The sort pattern can be used to define the size of each of these bundles. A kill pocket is a pocket in the document processor 14 that is assigned to items that are sent and remitted to another bank or destination without further sorting. The system 10 uses the merge-feed unit of the document processor 14 to hold the divider slips. When a bundle within a kill pocket reaches the limit, the document processor 14 automatically selects a divider slip from the merge-feed unit. Once the divider slip is in the input stream, the document processor 14 routes it to the correct kill pocket.

Individual items 12 follow the tracer, block, batch, and optional subbatch slips for capture of the magnetic ink character recognition (MICR) codeline data on the document. With respect to codeline data, capture means to read the codeline data that is inscribed on the document 12, to decode data, and to store the data. The document processor 14 reads each item and a prime pass sequence number is assigned to and printed on each item. As the document processor 14 reads data, the check processing controller 22 receives the data, creates a codeline data record and stores the codeline data record in a codeline database 26. The check processing controller 22 is conventional. An exemplary check processing controller is available from International Business Machines Corporation, New Orchard Road, Armonk, N.Y. 10504, and is known as the IBM Check Processing Control System ("CPCS"). The codeline data record is the electronic representation of the codeline captured from a check, deposit, debit, credit, or control document. The electronic representation can include additional data to help identify the record. The codeline database 26 contains records of all active document strings, and consists of two direct access data sets: a directory index and a data record set.

Guided by the encoded data and the user specified sort program, the document processor 14 sorts the documents 12 to the correct pockets. The pockets are either onus, kill, reject, or rehandle, according to the user specified sort pattern.

In the preferred embodiment, the check processing system 20 includes a conventional imaging controller 28, which is available from Check Solutions Company, 8275 Tournament Drive, Suite 300, Memphis Tenn. 38125, and is referred to as the ImagePlus High Performance Transaction System. The imaging controller 28 allows for the capture of the document image, which is stored by a conventional check imaging system 20 in an image database 30. Such a check imaging system is available from Check Solutions Company, 8275 Tournament Drive, Suite 300, Memphis Tenn. 38125, and is referred to as the Check Image Management System ("CIMS"). With respect to an image, capture means make a digitized image of a document, and storing the image in one or more data sets. The imaging controller 28 preferably is capable of capturing the full document image, that is, an image of both sides of the document.

The check imaging system 20 creates a MICR codeline data record in the codeline database 26 for each document 12 that passes through and is read by the document processor 14. Data, such as optical character recognition (OCR) data from remittances or a depositor's account number, is captured by the check imaging system 20 from the documents 12 that are processed on the document processor 14. As is known in the art, additional software is required so that the document processor 14 can read the data and pass it to the check processing system 20.

During the processing of any entry, the document processor 14 can reject a document 12 for various reasons. In the preferred embodiment, the document processor 14 sorts rejected items into two pockets, a system reject pocket (pocket-1) 16 and an alternate reject pocket (pocket-2) 18. A "rejected item" or a "reject" is a document that cannot be read in its entirety by the document processor 14 or that fails certain predetermined tests.

Documents 12 are sorted to pocket-1 16 if they are automatically selected by the document processor 14. A document 12 is automatically selected because the document processor 14 has determined that the document is thicker or longer than a predetermined thickness or length, or the MICR codeline data is not read within a predetermined amount of time. A document that is automatically selected for pocket-1 16 may be a "piggyback," that is, a document that attaches itself to or overlaps one or more other documents during processing by the document processor.

Documents are also sorted to pocket-1 16 if the document processor 14 captured an image of the document, but no MICR codeline data was captured. In cases where there is a document image but no MICR data captured, there are at least two possible causes. First, the document image may be improperly oriented, that is, the image is flipped or rotated. Second, the document was printed using ink that does not conform with ANSI standard E13b for Print Specifications for Magnetic Ink Character Recognition, which may indicate that the document is fraudulent.

Documents 12 are sorted to pocket-2 18 if some valid MICR codeline data was captured and they were not automatically selected to be sorted to pocket-1 16. Such documents are likely to be correctly oriented due to the fact that some MICR codeline data was captured.

Once the document processor 14 completes the prime pass processing of an entry, the codeline data and images are retrieved from the codeline database 26 and the image database 30, respectively, and transmitted to the reject repair server application 32.

Typically, the majority of rejected items are sorted to pocket-2 18, and the MICR codeline data can be repaired by a codeline data repair application 24 in a conventional manner, although the use of the physical item is typically required for data input. An exemplary codeline data repair application is available from International Business Machines Corporation, New Orchard Road, Armonk, N.Y. 10504, and is known as the Online Reject Repair ("OLRR") application. The keying client application 34 can be used to view the original prime pass image and prompt the operator for high speed keying of the fields needing repair. The codeline data repair application 24 performs edit validations and automatically repairs the codeline data while preserving the prime pass entry data relationships.

The pocket-2 rejects are then rehandled under the control of check processing controller 22 so that distribution can occur without having to recapture the items. These rehandled items are sorted to pockets based on corrected codeline data and, therefore, they do not have to be stripped and re-encoded.

It should be noted that pocket-2 rejected items with amount only errors could be further sorted and directed to a keying application that only corrected the amount field, which would yield higher keying rates.

Figure 2A:
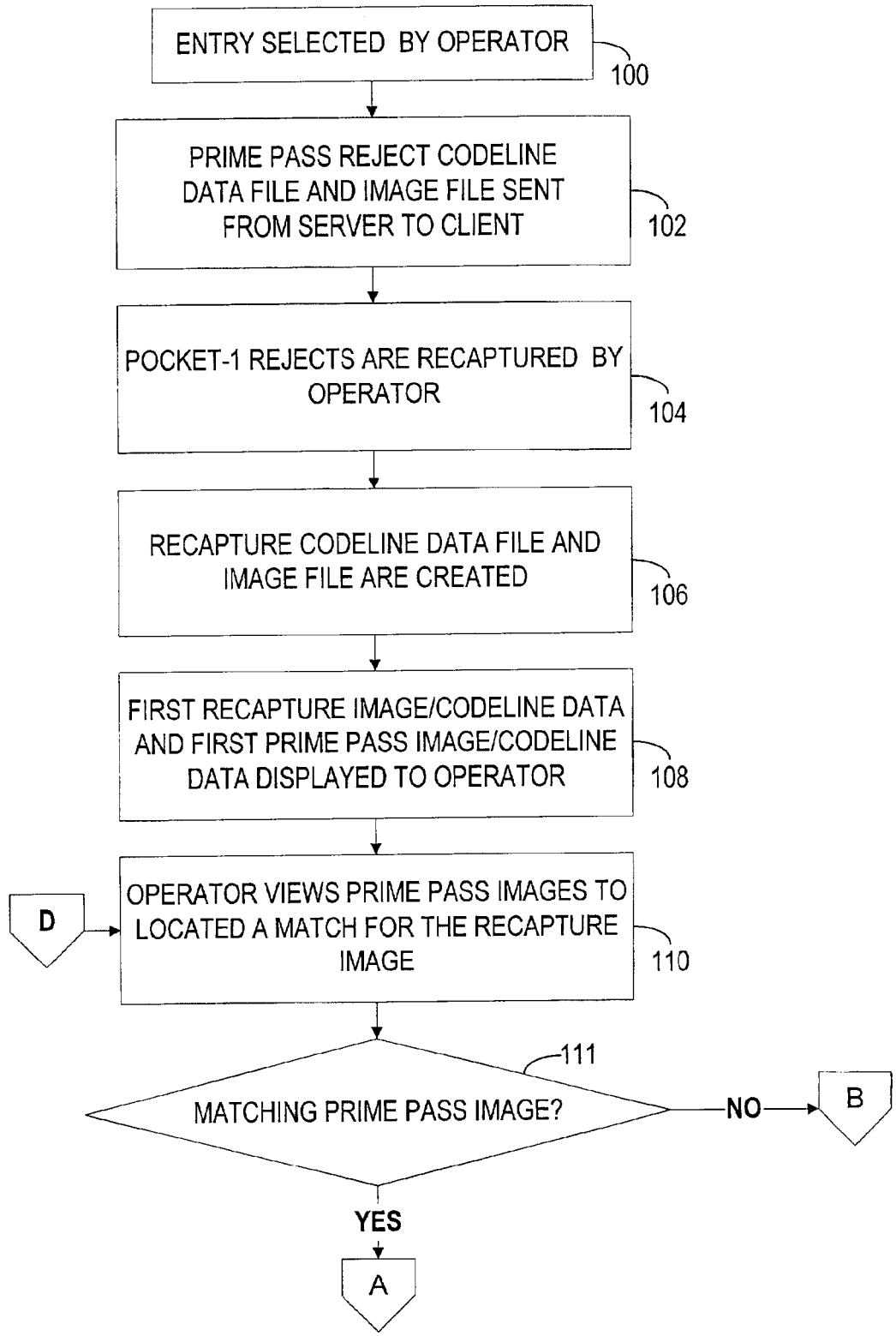
FIGS. 2A–2C is a high level data flow diagram illustrating the logic of the image repair application of the present invention.
Figure 2B:
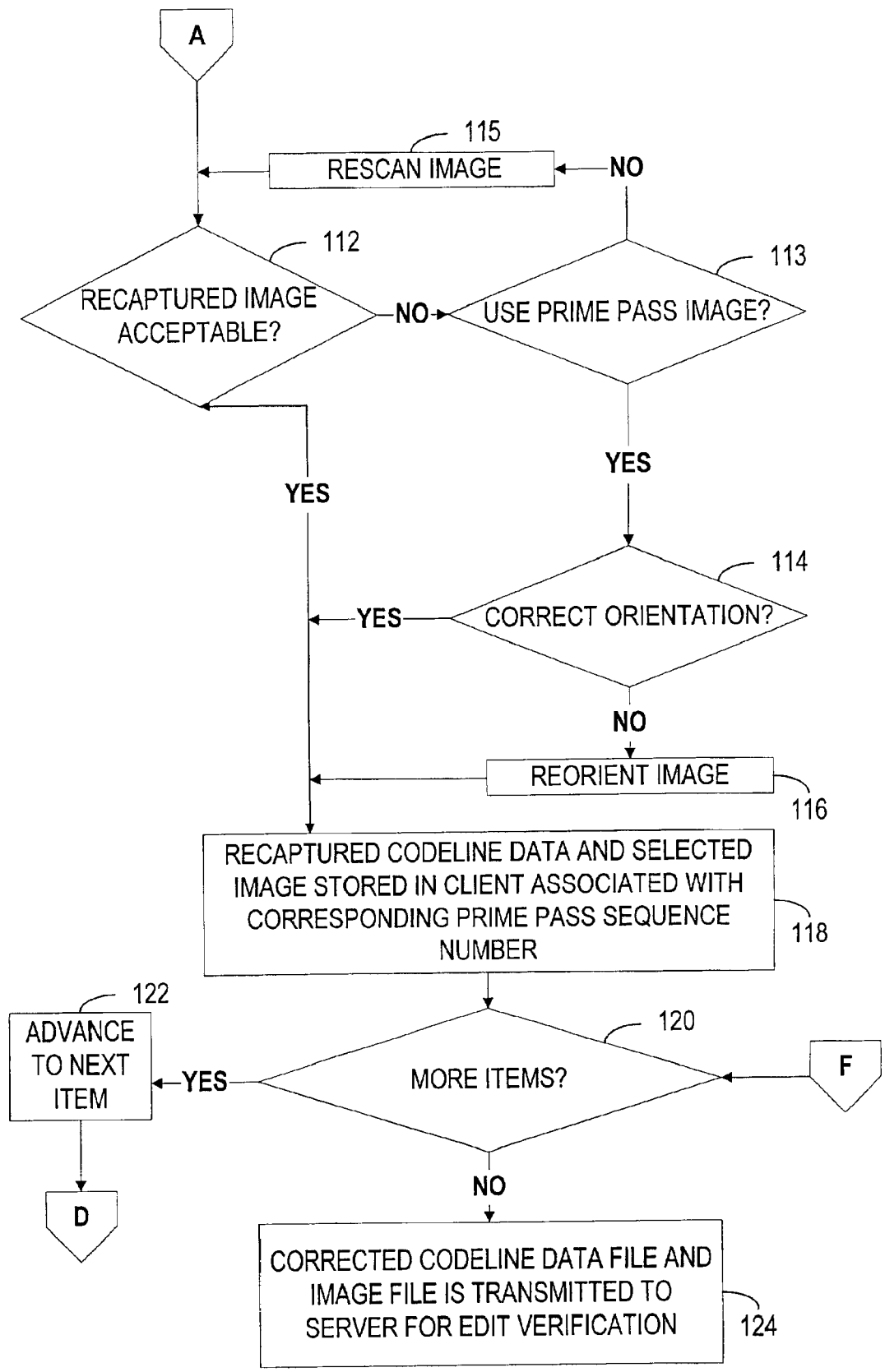
Figure 2C:
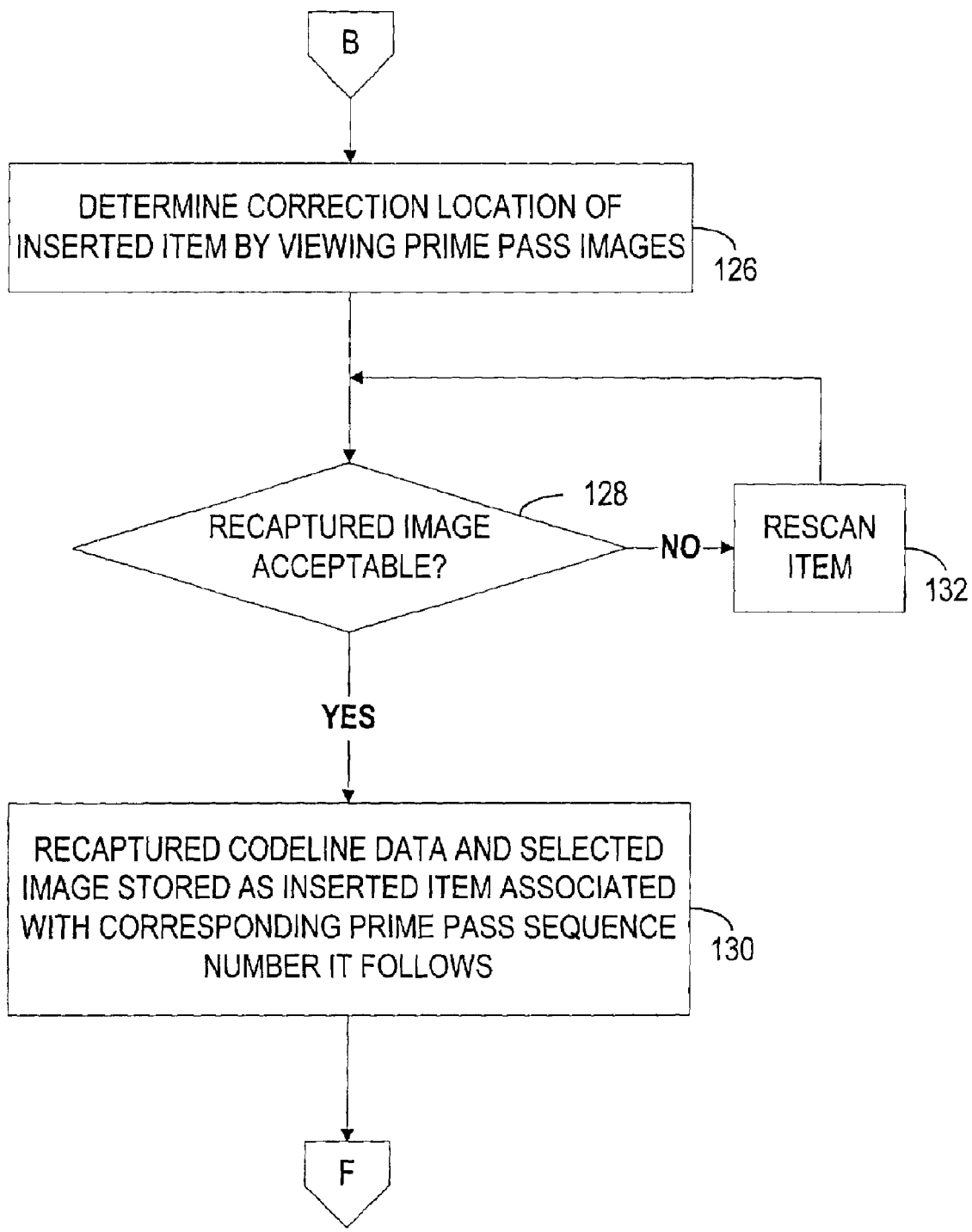
Figure 4:
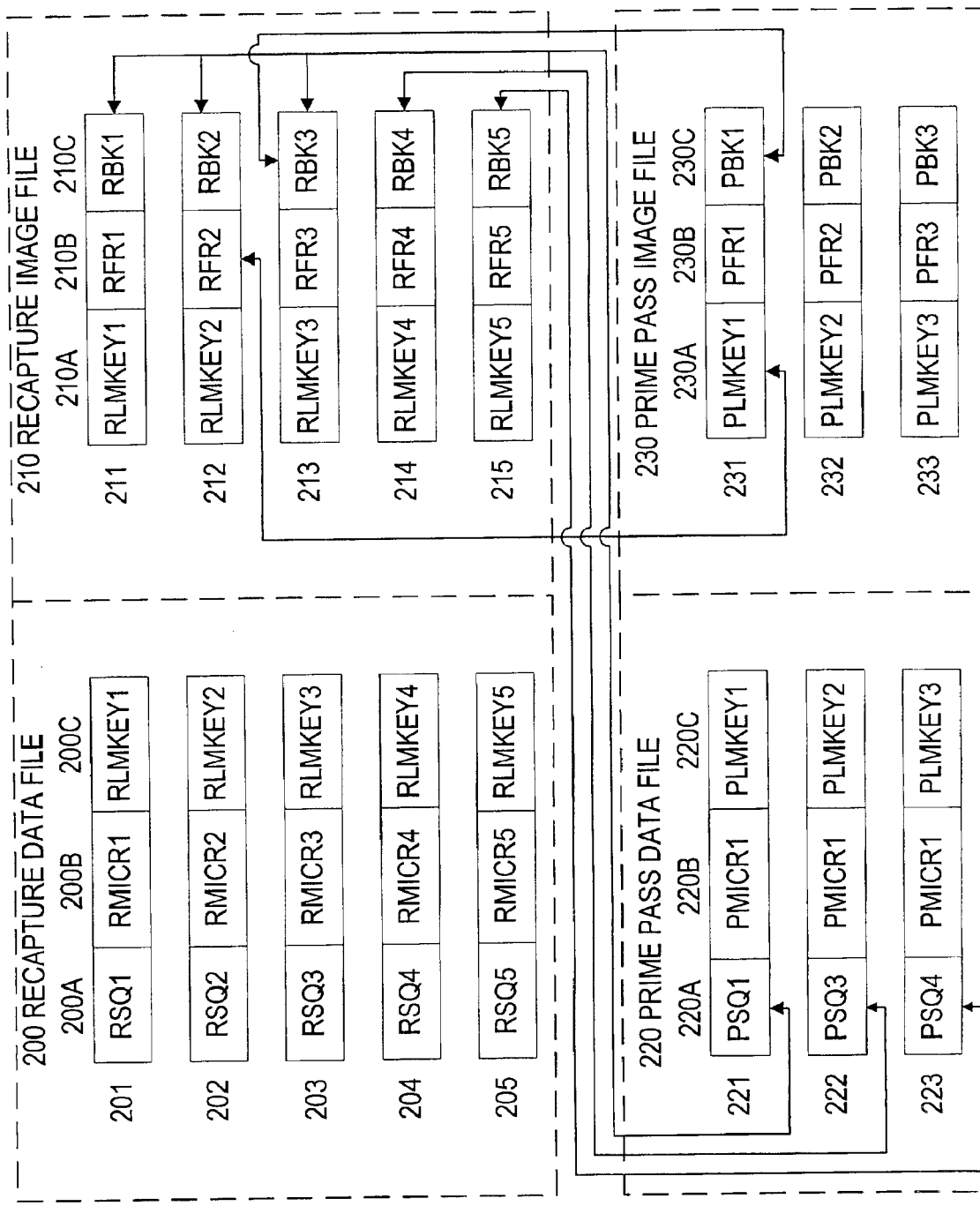
FIG. 4 is an illustration of the logical relationship between prime pass MICR codeline data and images and recapture MICR codeline data and images.

Pocket-1 rejected items are processed via the image repair client application 36. FIGS. 2A–2C are high level flow diagrams that represents the processing logic of the image repair client application. Turning to FIG. 2A, to start the processing of pocket-1 rejects, an operator selects an entry for processing (block 100). Upon selection of an entry, the prime pass codeline data file and the prime pass document image file for the rejected items, which were previously transmitted from the check processing system 20 to the reject repair server application 32, are then transmitted from the reject repair server application to the image repair client application (block 102). (The prime pass codeline data file and the prime pass document image file are illustrated in FIG. 4.) The rejected pocket-1 items are then recaptured by the operator (block 104). The rejected items can be recaptured in a batch mode or a single item at a time. In the preferred embodiment, the pocket-1 rejects are recaptured using a desktop scanner, with a MICR codeline reader, such as a BUIC 1500 Back Office Check Scanner, which is in electronic communication with the image repair client application. The BUIC 1500 Back Office Check Scanner is available from Digital Check Corporation, 466 Central Avenue, Suite 31, Northfield, Ill. 60093. Prior to recapturing the rejected items, the items should be reconditioned by straightening folded items, inverting upside-down items, flipping reversed items, separating "piggybacks," and removing any residual staples or rubber bands.

After recapturing the pocket-1 rejects, a recapture codeline data file and a recapture image file is created, there being a recapture codeline data record and a recapture image record for each recaptured reject (block 106). It should be noted that the codeline data record and the image record, for both prime pass and recapture, are associated by use of an sequence number and an image key. Next, the image repair client application displays the first recapture image and codeline data and the first rejected prime pass image and codeline data record (block 108). The operator then reviews the prime pass images to locate a match to the recaptured image (block 110). If the operator can locate a prime pass image that matches the recapture image (block 111), by visually comparing the recapture image with the prime pass images, processing continues with logic group A. If the operator cannot locate a matching prime pass image (block 111), processing continues with logic group B.

FIG. 2B illustrates the processing logic of logic group A. The operator was able to locate a matching prime pass image, and the operator determines whether the recaptured image is acceptable (block 112). Next, the operator determines whether to use the rescanned image or the prime pass image (block 113). If the operator selects the prime pass image, the operator then determines if the prime pass image is correctly oriented (block 114). If it is, processing continues with block 118. If the image is not correctly oriented, the operator re-orients the image (block 116) and processing then continues with block 118. If necessary, the operator can re-orient the image by rotating or flipping the image If the operator elects not to use the prime pass image (block 113), the image is rescanned (block 115), and the operator then determines whether the rescanned image is acceptable (block 112). If the recapture image is acceptable, processing continues with block 118. If the recapture image is not acceptable, the item is rescanned and processing continues from block 112, as described above.

After selecting the recaptured or prime pass image, the recaptured codeline data and selected image is associated with the corresponding prime pass sequence number of the matched prime pass image (block 118). If there are more items to process (block 120), the image repair client application advances to the next item (block 122) and processing returns to block 110. If the are no more items to be processed, the corrected codeline data file and image file are transmitted to the reject repair server application for edit verification (block 124).

FIG. 2C illustrates the processing logic of logic group B. Because the operator cannot locate a matching prime pass image, the recapture image is tagged as an inserted item and the operator determines the correct sequential location of the inserted item by viewing the prime pass images (block 126). If the recaptured image is acceptable (block 128), the recaptured codeline data and the image of the inserted item is associated with the corresponding prime pass sequence number that the inserted item follows (block 130) and processing continues with block 120. If the recaptured image is not acceptable (block 128), it is rescanned (block 132) until it is acceptable.

Figure 3:
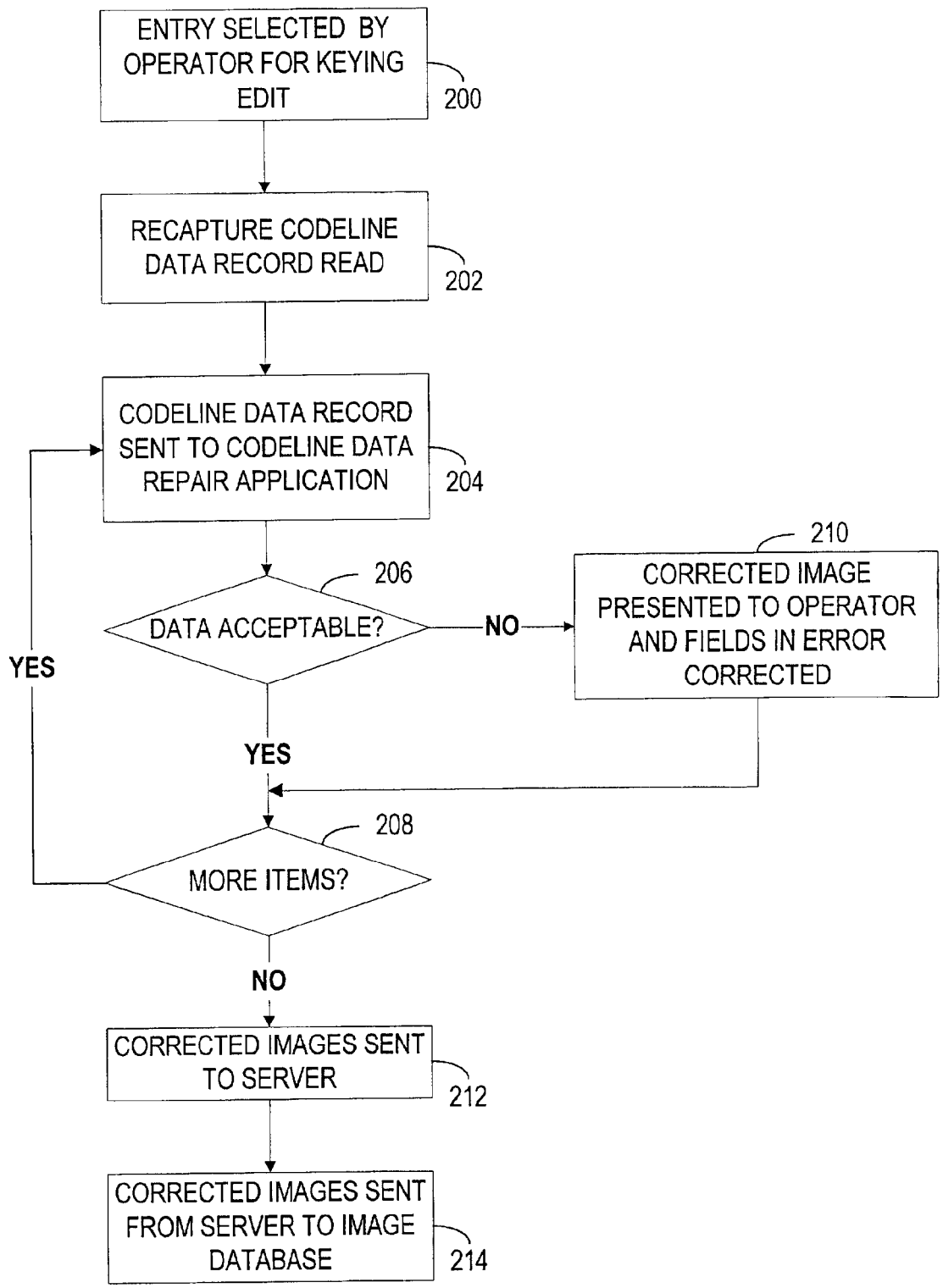
FIG. 3 is a high level data flow diagram illustrating the logic of the keying application of the present invention.

In addition, the present system incorporates a keying application 34 that interfaces with the codeline data repair application 24. FIG. 3 is a high level flow diagram that represents the processing logic of the keying client application. Both repaired pocket-1 items and pocket-2 items are processed by the keying application 34. Processing begins by selection of any entry by the operator for keying edit (block 200). The corrected codeline data file and corrected image file completed by the image repair client application 36 is transferred from the reject repair server application 32 to the keying client application 34. The first codeline data record is then read by the keying application (block 202), and the codeline data record is sent to the codeline data repair application for processing (block 204). If the codeline data repair application determines that the codeline data record is acceptable (block 206), the keying application determines whether there are more items for processing (block 208). If there are more items for processing, control is transferred to block 204. If the codeline data repair application determines that the codeline data record is not acceptable (block 206), a corrected image of the document corresponding to the codeline data is presented to the operator and any fields in error are corrected manually (block 210). Processing then passes to block 208.

If there are no more items for processing (block 208), the corrected codeline data is sent to the reject repair server application (block 212), and the images previously corrected by the image repair client application are then sent from the reject repair server application to the image data base for permanent storage (block 214).

In the preferred embodiment, the keying application presents a user interface that is advantageously designed to allow high speed keying with the codeline fields displayed under the check. The fields to be keyed and the errors in the codeline data are displayed in color for easy identification. The check size is controlled in two sizes (commercial or retail) so that they can be displayed as large as possible.

The keying application also advantageously incorporates automatic processes for disqualified items and determining if the correction is a character replacement or full field replacement. The keying application keeps track of all rejects accepted by the codeline data repair application so that if an operator needs to stop in the middle of an entry, or if an error occurs, an automatic restart can be accomplished. After the entries are corrected and the codeline data repair application completes processing for both pockets. The pocket-1 items would be repaired using strips and encoded using a power encoder, which is available from NCR Corporation, 1700 S. Patterson Blvd., Dayton, Ohio 45479, and is referred to as the NCR 7780. In an alternative embodiment, the pocket-1 items can be re-primed on the check processing controller 22 as a new entry with corrected code lines. The pocket-2 items can be processed on a power encoder, such as the NCR7780, with a hold and view feature. This allows the items to be controlled under the check processing controller as a rehandle and the distribution and kill of the item will be handled using the prime pass sequence numbers. The items do not have to be physically repaired since they can be sorted based on matched corrected data or the hold and view feature can allow data corrections. This eliminates the stripping process for 80–90% of the rejects.

FIG. 4 is an exemplary illustration of the logical (not physical) relationship between prime pass MICR codeline data and images and recapture MICR codeline data and images, and how the sequence of items are preserved by the image repair client application of the present invention in the event of a "piggyback." In this example, three data records 221, 222 and 223, and three corresponding image records 231, 232 and 233, were created during the prime pass. During recapture of these items, two new data records 202 and 203, and the corresponding image records 212 and 213, were created. The extra two data and image records are contained in the recapture data file 200 and recapture image file 210, but not in the prime pass data or image file, because during the prime pass, items represented by recapture data records 202 and 203 were attached to the item represented by recapture data record 201.

As can be seen in the example illustrated in FIG. 4, the prime pass data file 220 and the prime pass image file 230 are each comprised of three records, 221, 222 and 223, and 231, 232 and 233, respectively. Each data record created during the prime pass is comprised of three (3) fields. The first field 220a is the prime pass sequence number, which uniquely identifies the position of the prime pass data record within the group of records comprising the prime pass data file. The second field 220b is the MICR codeline data, and the third field 220c is an image key. Each data record created during recapture contains the same three (3) fields as for the data records created during the prime pass.

Similarly, each image record created during the prime pass is comprised of three (3) fields. The first field 230a is an image key. The association between data record for an item and the image record for the same item is established and maintained by the image key. As can be seen in this example, the image key for each data record is identical to the image key for each image record. The second field 230b is the image data for the front of the item and the third field 230c is the image data for the back of the item. Again, each image record created during recapture contains the same three (3) fields as for the image records created during the prime pass.

During the matching process performed by the image repair client application, when the front and back images for recapture record 201 are compared to the front and back images for prime pass record 221, it will be apparent that the front images are identical and that the back images are different. Thus, the operator knows that the item represented by the next record in the recapture data file 202 was attached to the item represented by the first record in the recapture data file 201 during the prime pass. Thus, the operator directs the image repair client application to associate recapture data record 202 with prime pass data record 221. For the same reason, the recapture data record 203 is also associated with prime pass data record 221. This will preserve the sequential relationship of the items represented by recapture data records 201, 202 and 203. It should also be noted that in this example, the back image of the item represented by recapture data record 203 will match the back image of the item represented by prime pass data record 221.

Finally, the front and back images for the items represented by recapture data records 204 and 205 match the front and back images for the items represented by prime pass data records 222 and 223.

Figure 5:
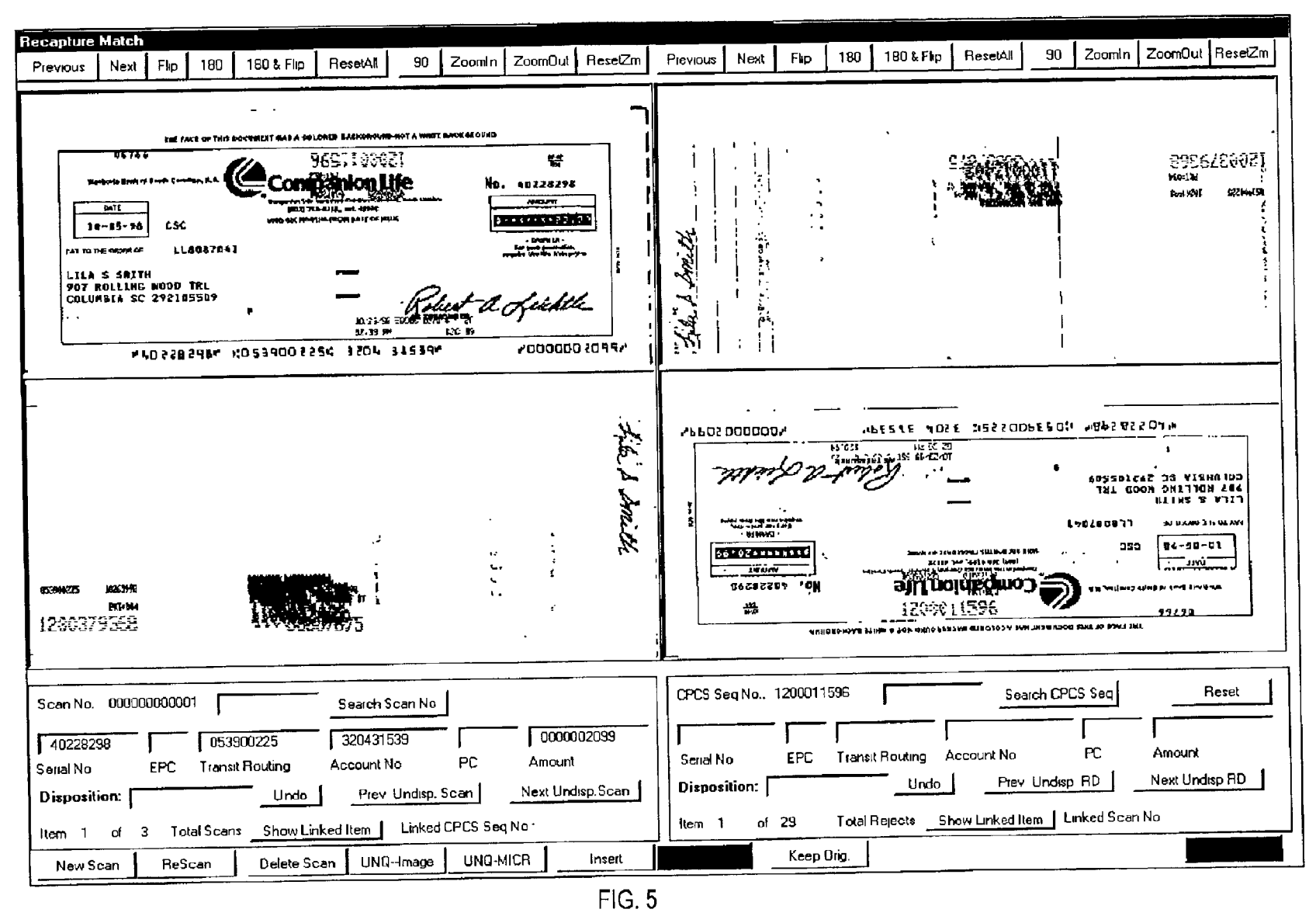

FIG. 5 is a screenshot 300 of a user interface to the image repair client application of the present invention.

Figure 6:
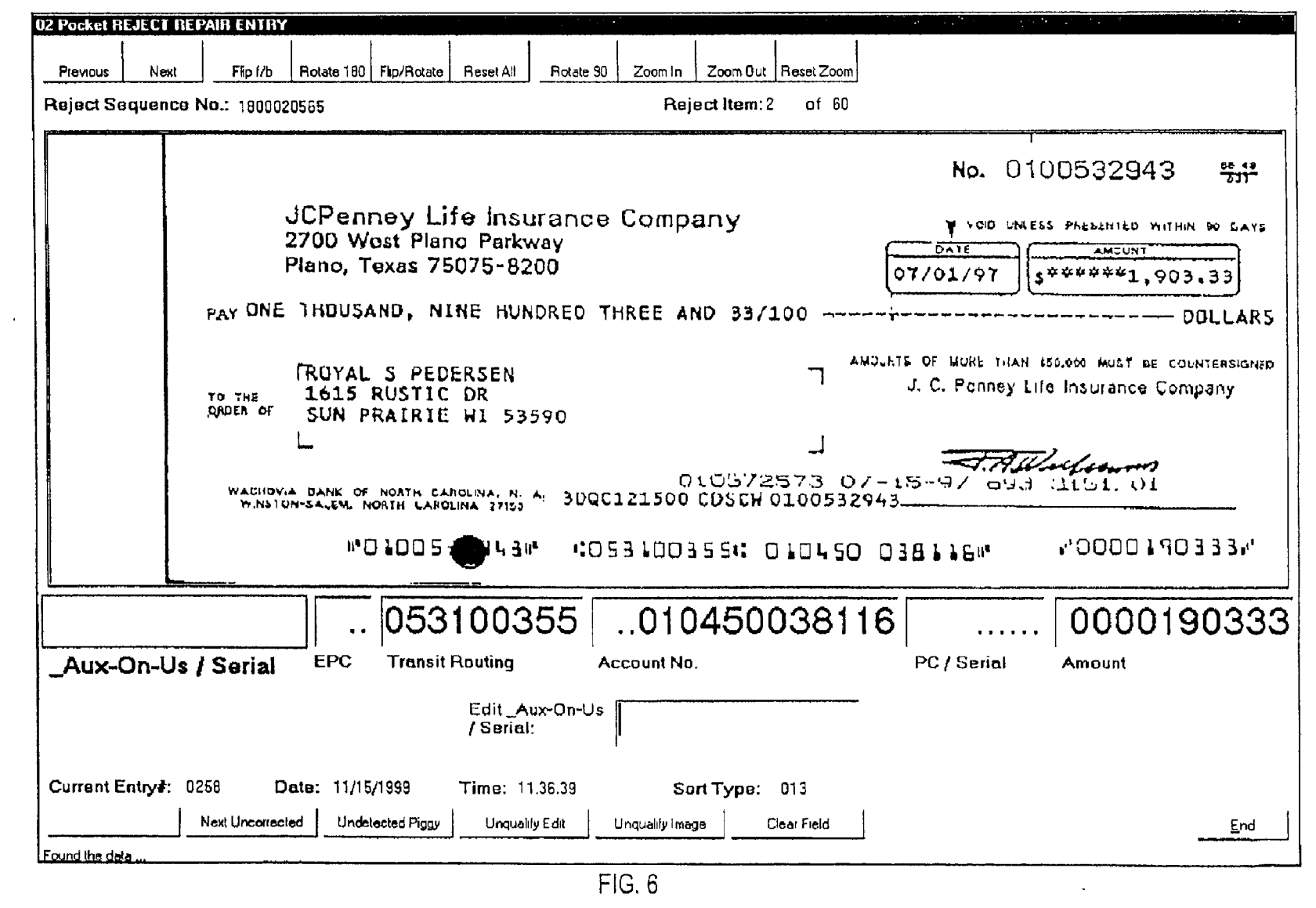

FIG. 6 is a screenshot 400 of a user interface to the keying application of the present invention.

The description of the preferred embodiments contained herein details the many ways the present invention can provide its intended purposes. While several preferred embodiments are described, it is apparent that various changes might be made without departing from the scope of the invention.

What is claimed is:

1. An apparatus for processing a plurality of financial documents, comprising:

(a) a document processor, wherein, for each financial document, the document processor
        (i) captures data encoded on the financial document and an image of the financial document during a prime pass, and
        (ii) assigns a first sequence number to each financial document;
    (b) a computer database, wherein, for each financial document, the captured data and image is stored in the computer database in association with the first sequence number for the financial document;
    (c) wherein, for each financial document, the document processor is adapted to determine, responsive to the captured data and images, whether the financial document is of a first type or a second type, wherein the first type is a document for which the data and document image needs to be repaired and the second type is a document for which the data needs to be repaired;

(d) wherein, for each document of the first type, the document processor recaptures the data encoded on the financial document, recaptures an image of the financial document, and assigns a second sequence number to the financial document, the recaptured data and the recaptured image being stored in the computer database in association with the second sequence number; and (e) a image repair application, wherein the image repair application is adapted to permit an operator to locate a captured image that matches the recaptured image, and to repair the document image by visually comparing the recaptured image with the captured image; and (f) wherein the repaired document image is stored in the computer database in association with the first sequence number for the captured data.

2. The apparatus of claim 1, wherein the image repair application is configured to allow the operator to repair the captured image by visually comparing the captured image with the recaptured image and selecting either the captured image or the recaptured image.

3. The apparatus of claim 2, wherein the image repair application is configured to permit the operator to repair the selected image by visually comparing the captured image with the recaptured image and reorienting the selected image.

4. The apparatus of claim 3, wherein the selected image is reoriented by rotating the captured image.

5. The apparatus of claim 3, wherein the selected image is reoriented by flipping the selected image.

6. The apparatus of claim 1, wherein, for each financial document of the first type for which there is a recaptured image, but no matching captured image, the recaptured image is stored in the computer database in correct relation to the financial document sequence established during the prime pass.

7. The apparatus of claim 1, wherein, for each financial document, the document processor is adapted to determine whether the financial document is of the first type by determining whether the financial document exceeds a predetermined document thickness.

8. The apparatus of claim 1, wherein, for each financial document, the document processor is adapted to determine whether the financial document is of the first type by determining whether the financial document exceeds a predetermined document size.

9. The apparatus of claim 8, wherein, the predetermined document size is comprised of a predetermined document length.

10. The apparatus of claim 8, wherein, the predetermined document size is comprised of a predetermined document height.

11. The apparatus of claim 1, wherein, for each financial document, the document processor is adapted to determine whether the financial document is of the first type if the data encoded on the financial document is not read within a predetermined amount of time.

12. The apparatus of claim 1, wherein, for each financial document, the document processor is adapted to determine whether the financial document is of the first type if no data is read from the document.

13. An apparatus for processing a plurality of financial documents, comprising:
(a) a first document processor, wherein, for each financial document, the first document processor
(i) captures data encoded on the financial document and an image of the financial document during a prime pass, and
(ii) assigns a first sequence number to each financial document;
(b) a computer database, wherein, for each financial document, the captured data and image is stored in the computer database in association with the first sequence number for the financial document;
(c) wherein, for each financial document, the first document processor is adapted to determine, responsive to the captured data and images, whether the financial document is of a first type or a second type, wherein the first type is a document for which the data and document image needs to be repaired and the second type is a document for which the data needs to be repaired;
(d) wherein, for each document of the first type, a second document processor recaptures the data encoded on the financial document, recaptures an image of the financial document, and assigns a second sequence number to the financial document, the recaptured data and the recaptured image being stored in the computer database in association with the second sequence number; and
(e) a image repair application, wherein the image repair application is adapted to permit an operator to locate a captured image that matches the recaptured image, and to repair the document image by visually comparing the recaptured image with the captured image; and
(f) wherein the repaired document image is stored in the computer database in association with the first sequence number for the captured data.

14. An apparatus for processing a plurality of financial documents, comprising:
(a) a document processor, wherein, for each financial document, the document processor
(i) captures data encoded on the financial document and an image of the financial document during a prime pass, and
(ii) assigns a sequence number to each financial document;
(b) a computer database, wherein, for each financial document, the captured data and image is stored in the computer database in association with the sequence number for the financial document;
(c) wherein, for each financial document, the document processor is adapted to determine, responsive to the captured data and images, whether the financial document is of a first type or a second type, wherein the first type is a document for which the data and document image needs to be repaired and the second type is a document for which the data needs to be repaired;
(d) a keying application, wherein the keying application is adapted to permit an operator to repair the captured data by visually comparing the captured image with the captured data; and
(e) the repaired data is stored in the computer database in association with the sequence number for the document.

* * * * *